United States Patent
Agarwal et al.

(10) Patent No.: US 11,551,142 B2
(45) Date of Patent: Jan. 10, 2023

(54) SYSTEMS AND METHODS FOR CONVERSATIONAL BASED TICKET LOGGING

(71) Applicant: Tata Consultancy Services Limited, Mumbai (IN)

(72) Inventors: Puneet Agarwal, Noida (IN); Mayur Patidar, Noida (IN); Lovekesh Vig, Gurgaon (IN); Gautam Shroff, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 674 days.

(21) Appl. No.: 16/653,871

(22) Filed: Oct. 15, 2019

(65) Prior Publication Data
US 2020/0125992 A1    Apr. 23, 2020

(30) Foreign Application Priority Data
Oct. 19, 2018  (IN) .......................... IN201821039649

(51) Int. Cl.
*G06N 20/00* (2019.01)
*G06F 16/903* (2019.01)

(52) U.S. Cl.
CPC ....... *G06N 20/00* (2019.01); *G06F 16/90335* (2019.01)

(58) Field of Classification Search
CPC ............................ G06N 20/00; G06F 16/90335
USPC .......................................................... 706/12
See application file for complete search history.

(56) References Cited

U.S. PATENT DOCUMENTS

| | | | |
|---|---|---|---|
| 7,139,754 B2 | 11/2006 | Goutte et al. | |
| 10,009,375 B1* | 6/2018 | Sites | G06N 3/08 |
| 2018/0165288 A1* | 6/2018 | Chang | G06N 3/0454 |
| 2018/0329884 A1* | 11/2018 | Xiong | G06N 3/0454 |
| 2018/0336241 A1* | 11/2018 | Noh | G06F 16/242 |
| 2022/0058523 A1* | 2/2022 | Falcon | G06N 20/00 |

(Continued)

OTHER PUBLICATIONS

Chen, Deep Learning for Dialogue Systems, Jul. 30, 2017, National Taiwan University, pp. 1-157 (Year: 2017).*

(Continued)

*Primary Examiner* — Kenneth W Chang
*Assistant Examiner* — Gregory A Lane
(74) *Attorney, Agent, or Firm* — Finnegan, Henderson, Farabow, Garrett & Dunner LLP

(57) ABSTRACT

Users have to assign labels to a ticket to route to right domain expert for resolving issue(s). In practice, labels are large and organized in form of a tree. Lack in clarity in problem description has resulted in inconsistent and incorrect labeling of data, making it hard for one to learn/interpret. Embodiments of the present disclosure provide systems and methods that identify relevant queries to obtain user response, for identification of right category and ticket logging there. This is achieved by implementing attention based sequence to sequence (seq2seq) hierarchical classification model to assign the hierarchical categories to tickets, followed by a slot filling model to enable identifying/deciding right set of queries, if the top-k model predictions are not consistent. Further, training data for slot filling model is automatically generated based on attention weight in the hierarchical classification model.

12 Claims, 8 Drawing Sheets

(56) References Cited

U.S. PATENT DOCUMENTS

2022/0220469 A1\* 7/2022 Zhang .................... C12N 9/22

OTHER PUBLICATIONS

Graves, "Supervised Sequence Labelling with Recurrent Neural Networks", Jun. 19, 2008, Technische Universitat Munchen, pp. 1-124 (Year: 2008).\*

Triguero, I. et al. (2016). "Labelling strategies for hierarchical multi-label classification techniques," *Pattern Recognition*, vol. 56; pp. 170-183.

Zhou, Y. et al. (Mar. 2014). "A Taxonomy of Label Ranking Algorithms," *Journal of Computers*, vol. 9, No. 3; pp. 557-565.

Yang, P. et al. (Jun. 2018). "SGM: Sequence Generation Model for Multi-Label Classification," located at https://arxiv.org/pdf/1806.04822.pdf. (12 pages).

Vinyals, O. et al. (Jun. 2015). "A Neural Conversational Model," located at https://arxiv.org/pdf/1506.05869.pdf. (8 pages).

\* cited by examiner

| Attention Weight (AW) | Symbol |
|---|---|
| <0.1 | ◇ |
| 0.1-0.5 | ◯ |
| 0.5-0.9 | ▢ |
| 0.9-1.0 | △ |

| | Please | reset | my | india | domain | password |
|---|---|---|---|---|---|---|
| User_Account_Issues-India | ◇ | ◯ | ◇ | ◇ | ◯ | ◯ |
| India_domain | ◇ | ◇ | ◇ | △ | ◇ | ◇ |
| ABC_domain | ◇ | ◇ | ◇ | △ | ◇ | ◇ |
| Internal_IT | ◇ | ◇ | ◇ | ◯ | ◯ | ◇ |

FIG. 6

| AW | Symbol |
|---|---|
| <0.1 | ◇ |
| 0.1-0.5 | ◯ |
| 0.5-0.9 | ▭ |
| 0.9-1.0 | △ |

| | How | to | configure | lotus | notes | on | my | laptop |
|---|---|---|---|---|---|---|---|---|
| Configuration/Installation | ▭ | ◇ | ◯ | ◇ | ◇ | ◇ | ◇ | ◇ |
| Lotus_Notes | ◇ | ◇ | ◇ | ◯ | ◯ | ◇ | ◇ | ◇ |
| Email_services | ◇ | ◇ | ◇ | ◇ | △ | ◇ | ◇ | ◇ |
| Internal_IT | ◇ | ◇ | ◇ | ◯ | ▭ | ◇ | ◇ | ◇ |

FIG. 7

SYSTEMS AND METHODS FOR CONVERSATIONAL BASED TICKET LOGGING

PRIORITY CLAIM

This U.S. patent application claims priority under 35 U.S.C. § 119 to: India Application No. 201821039649, filed on Oct. 19, 2018. The entire contents of the aforementioned application are incorporated herein by reference.

TECHNICAL FIELD

The disclosure herein generally relates to automatic ticket logging systems, and, more particularly, to systems and methods for conversational based ticket logging.

BACKGROUND

Helpdesk is a key component of any large IT organization, where users can log a ticket about any issue they face related to IT infrastructure, administrative services, human resource services, etc. Normally, users have to assign appropriate set of labels to a ticket so that it could be routed to right domain expert who can help resolve the issue. In practice, the number of labels are very large and organized in form of a tree. It is non-trivial to describe the issue completely and attach appropriate labels unless one knows the cause of the problem and the related labels. Sometimes domain experts discuss the issue with the users and change the ticket labels accordingly, without modifying the ticket description. This results in inconsistent and incorrectly labeling data, making it hard for supervised algorithms to learn from.

SUMMARY

Embodiments of the present disclosure present technological improvements as solutions to one or more of the above-mentioned technical problems recognized by the inventors in conventional systems. For example, in one aspect, there is provided a processor implemented method for processing words of problem description to identify queries and obtain responses from user to automatically log ticket on behalf of the user. The method comprises receiving, via one or more hardware processors, an input data comprising a problem description; sequentially processing, via a Sequence to Sequence (Seq2Seq) Hierarchical Classification Model executed by the one or more hardware processors, each word from the problem description to output a set of class labels that are hierarchically arranged, wherein each class label from the set of class labels is assigned a confidence score, wherein each word is assigned an attention weight based on a corresponding class label; and wherein the Sequence to Sequence (Seq2Seq) Hierarchical Classification Model is trained using historical data specific to one or more domains; determining, via a Seq2Seq Slot Filling Model, a presence or an absence of information comprised in the problem description pertaining to each of the set of class labels that are hierarchically arranged, wherein training data for the Seq2Seq Slot Filling Model is generated based on one or more problem descriptions of one or more tickets and associated previously corrected class labels comprised in the historical data specific to one or more domains, and wherein the associated previously corrected class labels are predicted by the Sequence to Sequence (Seq2Seq) Hierarchical Classification Model; sequentially identifying, using historical data, a set of queries based on the presence or absence of information comprised in the problem description to obtain a set of responses corresponding to the set of queries; determining an update requirement of the confidence score pertaining to each class label from the set of class labels based on the set of responses; dynamically updating, based on the determined update requirement, the confidence score pertaining to each class label from the set of class labels based on the set of responses to obtain a set of updated confidence scores; and automatically logging a ticket corresponding to the problem description based on the set of responses and the set of updated confidence scores.

In an embodiment, the set of queries may be identified when the confidence score of a plurality of class labels from the set of class labels is less than or greater than a predefined confidence threshold.

In an embodiment, the relationship between a word in the problem description and a corresponding predicted class label may be based on a corresponding assigned attention weight.

In an embodiment, the step of processing each word from the problem description may comprise identifying one or more relevant words and one or more irrelevant words.

In an embodiment, the training data for the Seq2Seq Slot Filling Model is generated by: assigning one or more labels to a word comprised in a problem description of a corresponding ticket when (i) summation of attention weights associated with a set of words comprised in the problem description is greater or equal to a threshold attention weight, and (ii) cardinality of the set of words is less than a word count threshold.

In another aspect, there is provided a system for processing words of problem description to identify queries and obtain responses from user to automatically log ticket on behalf of the user. The system comprises a memory storing instructions; one or more communication interfaces; and one or more hardware processors coupled to the memory via the one or more communication interfaces, wherein the one or more hardware processors are configured by the instructions to: receive an input data comprising a problem description; sequentially process, via a Sequence to Sequence (Seq2Seq) Hierarchical Classification Model executed by the one or more hardware processors, each word from the problem description to output a set of class labels that are hierarchically arranged, wherein each class label from the set of class labels is assigned a confidence score, wherein each word is assigned an attention weight based on a corresponding class label; and wherein the Sequence to Sequence (Seq2Seq) Hierarchical Classification Model is trained using historical data specific to one or more domains; determine, via a Seq2Seq Slot Filling Model executed by the one or more hardware processors, a presence or an absence of information comprised in the problem description pertaining to each of the set of class labels that are hierarchically arranged, wherein training data for the Seq2Seq Slot Filling Model is generated based on one or more problem descriptions of one or more tickets and associated previously corrected class labels comprised in the historical data specific to one or more domains, and wherein the associated previously corrected class labels are predicted by the Sequence to Sequence (Seq2Seq) Hierarchical Classification Model; identify, using historical data, a set of queries based on the presence or absence of information comprised in the problem description to obtain a set of responses corresponding to the set of queries; determine an update requirement of the confidence score pertaining to each class label from the set of class labels based on the set of responses; dynamically update, based on the determined update requirement, the confidence score pertaining to each class label from the set of class labels based on the set of responses to obtain a set of updated confidence scores; and automatically log a ticket corresponding to the problem description based on the set of responses and the set of updated confidence scores.

In an embodiment, the set of queries may be identified when the confidence score of a plurality of class labels from the set of class labels is less than or greater than a predefined confidence threshold.

In an embodiment, relationship between a word in the problem description and a corresponding predicted class label may be based on a corresponding assigned attention weight.

In an embodiment, each word from the problem description is sequentially processed to identify one or more relevant words and one or more irrelevant words.

In an embodiment, the training data for the Seq2Seq Slot Filling Model is generated by: assigning one or more labels to a word comprised in a problem description of a corresponding ticket when (i) summation of attention weights associated with a set of words comprised in the problem description is greater or equal to a threshold attention weight, and (ii) cardinality of the set of words is less than a word count threshold.

In yet another aspect, there are provided one or more non-transitory machine readable information storage mediums comprising one or more instructions which when executed by one or more hardware processors causes a method for validating domain specific model(s). The instructions comprise receiving, via one or more hardware processors, an input data comprising a problem description; sequentially processing, via a Sequence to Sequence (Seq2Seq) Hierarchical Classification Model executed by the one or more hardware processors, each word from the problem description to output a set of class labels that are hierarchically arranged, wherein each class label from the set of class labels is assigned a confidence score, wherein each word is assigned an attention weight based on a corresponding class label; and wherein the Sequence to Sequence (Seq2Seq) Hierarchical Classification Model is trained using historical data specific to one or more domains; determining, via a Seq2Seq Slot Filling Model, a presence or an absence of information comprised in the problem description pertaining to each of the set of class labels that are hierarchically arranged, wherein training data for the Seq2Seq Slot Filling Model is generated based on one or more problem descriptions of one or more tickets and associated previously corrected class labels comprised in the historical data specific to one or more domains, and wherein the associated previously corrected class labels are predicted by the Sequence to Sequence (Seq2Seq) Hierarchical Classification Model; sequentially identifying, using historical data, a set of queries based on the presence or absence of information comprised in the problem description to obtain a set of responses corresponding to the set of queries; determining an update requirement of the confidence score pertaining to each class label from the set of class labels based on the set of responses; dynamically updating, based on the determined update requirement, the confidence score pertaining to each class label from the set of class labels based on the set of responses to obtain a set of updated confidence scores; and automatically logging a ticket corresponding to the problem description based on the set of responses and the set of updated confidence scores.

In an embodiment, the set of queries may be identified when the confidence score of a plurality of class labels from the set of class labels is less than or greater than a predefined confidence threshold.

In an embodiment, the relationship between a word in the problem description and a corresponding predicted class label may be based on a corresponding assigned attention weight.

In an embodiment, the step of processing each word from the problem description may comprise identifying one or more relevant words and one or more irrelevant words.

In an embodiment, the training data for the Seq2Seq Slot Filling Model is generated by: assigning one or more labels to a word comprised in a problem description of a corresponding ticket when (i) summation of attention weights associated with a set of words comprised in the problem description is greater or equal to a threshold attention weight, and (ii) cardinality of the set of words is less than a word count threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 illustrates an attention heat map for user query "Please reset my India domain password" in accordance with an example embodiment of the present disclosure.

FIG. 7 illustrates an attention heat map for user query "How to configure lotus notes on the laptop?" in accordance with an example embodiment of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

A system to facilitate helpdesk operations is present in almost all large organizations and it is often one of the most frequently used applications. Large number of helpdesk tickets are raised every month by employees distributed across the globe in such organizations. Normally, in a helpdesk system users are first required to specify multi-level (hierarchical) category under which they want to raise a ticket and then provide textual description of the problem (also referred as 'problem description' or 'ticket description'). This multi-level category is actually a path from root-node to a leaf node of a tree. This is often managed with the help of dynamically populated drop-down fields in the user interface. These category annotations on the tickets are used for assignment of the ticket to appropriate domain expert (helpdesk staff) who can resolve the issue. If the category has been chosen wrongly/incorrectly, the support personnel who receives it in their work-list, changes the category so that such tickets get routed to right person. Clearly, this takes longer to resolve such tickets because of re-routing.

From analysis of history ticket data taken from a currently used system and experiments conducted by the present disclosure, it was found that many tickets with very similar textual descriptions have different categories associated with them (e.g., 10-20% tickets). Prima facie it appears to be the case of label noise, i.e., some tickets are wrongly/incorrectly labeled with category. However, after further analysis it was found that sometimes this happens due to human error and sometimes after users raise the ticket, there is a private conversation between the support personnel and the requester, which is not captured in the system. Based on this conversation the ticket category is changed without changing the ticket description, leading to an illusion of label noise. Similarly, it was found that often times the ticket (or problem) descriptions are not complete, which leads to such personal phone calls.

Figure 1A:
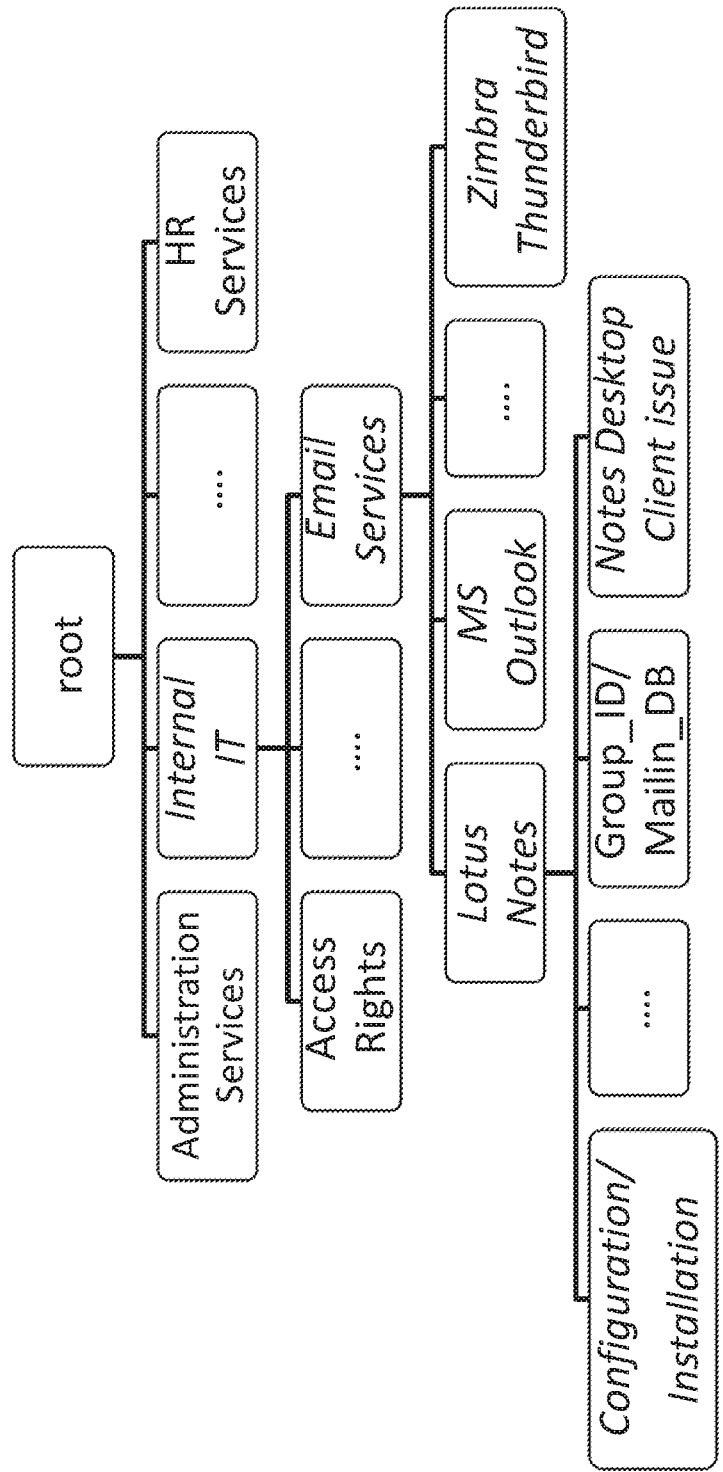
FIG. 1A depicts part of Label Hierarchy, in accordance with an example embodiment of the present disclosure.

The technologies and areas of support vary widely, as it comprises of e-mail related issues, operating system and performance issues, Enterprise Resource Planning (ERP) system related issues, issues related to hygiene and cleaning of work areas, and, even salary and payroll related issues etc. All these categories were covered by a class tree having say 'x' number of leaf nodes (e.g., 1275) and on an average the height of such class tree is found to vary from 4 to 5. The total number of nodes in a class tree are about 1918. As a result, the terminologies used are large and match across domains, e.g., 'mouse' can refer to a 'rat' or to a 'computer mouse'. The nodes in the class tree keep changing with time, with change in technology and operating environment in the organization. On an average about 2-3 nodes are changed (added or modified) every month. Sample class tree is shown in FIG. 1A. In other words, FIG. 1A depicts Label Hierarchy, in accordance with an example embodiment of the present disclosure.

Some of the leaf nodes and sometimes even the second last node can only be determined based on logical reasoning that is often performed by human. For example, as shown in Table 1 below, when a user reports the issue "My e-mail is not working", it could be because of some problem in web-mail configuration ($Y_1$) or could be because user's e-mail database on the server itself is corrupt ($Y_2$), as a result user may not be able to access e-mail from any user-interface at all. Therefore, the leaf node category can be best arrived at after asking a question to the user, as shown in Table 1.

TABLE 1

Examples of user queries with ground truth labels

| Sl. No | Ticket Description | Questions to be asked | Category |
|---|---|---|---|
| $d_1$ | My e-mail is not working | Q1: Which e-mail do you use: Lotus notes, Outlook, Zimbra? Ans-2: Lotus Notes | $Y_i$ = Internal-IT > E-mail Services > Lotus Notes > . . . |
| $d_2$ | My lotus notes e-mail is not working | Q-2: Is your e-mail working from the desktop application? Ans-2: Yes | $Y_1$ = Internal-IT > E-mail Services > Lotus Notes > Webmail configuration |
| $d_2$ | | Q-2: Is your e-mail working from the desktop application? Ans-2: No | $Y_2$ = Internal-IT > E-mail Services > Lotus Notes > Mail-in DB Issues |
| $d_3$ | need to install mozilla thunderbird to send patch | None | $Y_3$ = Internal-IT > E-mail Services > Zimbra/Thunderbird > Install/Configure_Desktop_Client |
| $d_4$ | AC is not working | Q-1: Is it related to excess/insufficient cooling or AC is not working at all? Ans-1: kindly increase the cooling | $Y_4$ = Administration services > Air-Conditioner > Working Area > AC In-Sufficient Cooling |
| $d_5$ | please reset password | Q-1: Which password do you want to reset! (email/TCS/Non-TCS Domain) | $Y_5$ = Internal-IT > TCS Domain > India Domain > User Account Issues-India |

TABLE 1-continued

Examples of user queries with ground truth labels

| Sl. No | Ticket Description | Questions to be asked | Category |
|---|---|---|---|
| | | Ans-1: I am on India domain | |

The objective in this setting is to reduce the time taken to resolve the tickets and to minimize the number of tickets raised by people. In order to achieve these goals, the present disclosure intends to deploy a conversational assistant that could assign the category (i.e., path from root-node to leaf-node in the class tree) automatically to a ticket description given by the user. Sometimes in order to arrive at the appropriate category additional questions need to be asked to the user. If the system is configured to ask these questions, the system also needs to be trained to parse the user response to those questions, which can be in natural language. This takes significant effort to configure the system to ask various questions in 100s of these categories, and multiple parsers (e.g., say 100s of these) have to been written to extract the required information from the natural language response from the user. This is a recurring process—in the sense to be performed on regular basis as the class tree keeps changing with time. Therefore, it is a non-trivial problem to solve in presence of incorrectly labeled ticket data as described above.

In the present disclosure, systems and methods are provided that implement a conversational helpdesk system (also referred to as framework). The system automatically decides what question to ask the users, especially when additional information is needed to arrive at the complete hierarchical category. For this, at first a sequence to sequence recurrent neural network is used to decide what would be the hierarchical category for a ticket description (or problem description). From the tickets which got classified with high confidence by this model, the system of the present disclosure automatically generates data for training a slot filling model (based on another recurrent neural network model) that helps in deciding what question to ask to the user. This slot filling model takes the ticket description as input and predicts that information about which all slots is available in the given narration, i.e., what question should not be asked. The framework can also be used to parse the natural language user responses against the questions asked by the system. The training data for the slot filling model is generated by observing the words which receive higher attention by the sequence to sequence model. The slot filling model is used only when the confidence of the ticket classification model is not high. As a result, the conversational helpdesk system of the present disclosure takes historical ticket data, and can start working automatically without much of configuration and customization.

There have been several research works in the past on Hierarchical Multi-class Classification (HMC) for multiple domains, such as text, music, images, speech, and the like. Generally, in HMC, labels are present in the forms of trees or Directed Acyclic graphs (DAGs). Such Approaches for HMC are broadly classified into three types, namely, "Flat Classification", "Local" and "Global" or "Big-Bang". In Flat classification, the structure of the label hierarchy is ignored and a single classifier is trained to discriminate between the leaf nodes of the hierarchy and at the test time all the labels which are present on the path from the root to a leaf are assigned to the given instance. In the "Local" approach also referred to as Top-Down approach, there are three ways in which the label hierarchy is exploited during training. In "Local classifier per node", a separate binary classifier is trained for each node of the hierarchy whereas in "Local classifier per parent node", a separate multi-class classifier is trained for every non leaf node of the hierarchy. In the past, researchers have also exploited the relationships between labels present in form of a hierarchy by training multi-class classifier for each level. In all the variants of the "Local" approach, inferencing at a level i depends on the predictions made by the classifier at i–1th level i.e., if a classifier makes a mistake (e.g., or an error) at an upper level of the hierarchy, then the error is propagated downwards in the hierarchy. In the global approach, the objective is to train a single complex model which considers the label hierarchy during training instead of different local classifiers. Similar to the global approach, the present disclosure performs training of a single Sequence to Sequence (Seq2Seq) classification model for classification and for a test instance labels are predicted in top-down fashion similar to local approaches.

Further, Slot filling can be treated as a sequence labeling problem. With the slot filling approach of the present disclosure, the system enables one to many mapping between words and slots which may not be seen in existing research works.

Furthermore, ticket classification has also been studied in the past. However, in the conventional approaches it is either to reduce ticket resolution time by assigning the ticket to appropriate domain experts automatically or to recommend resolution steps based on the resolved tickets in the past. On the contrary, in the present disclosure, label hierarchy is used to route the tickets. The system also implements an approach for question asking when the model makes a low confidence prediction. Therefore, instead of just relying on the model's confidence, the system of the present disclosure implements slot filling technique (or model) in conjunction with the model's confidence to check whether the information given by a user is sufficient to arrive at the correct sequence of labels.

There are research works which have used encoder-decoder framework and reinforcement learning based approaches for creating open domain conversational systems. Such approaches take multi-turn dialogue, held between user and support staff, as input data instead of data from helpdesk system. Such systems learn to imitate the support staff and sometimes ask a question to the user. However, in the framework of the present disclosure, the system asks a question to the user only if system is not able to predict the class (i.e., prediction confidence is low or high than pre-defined confidence score/pre-defined threshold) and slot filling model is not able to detect the presence of relevant information in the user utterance.

For a typical problem description and to raise a ticket, normally, user has to provide a set of categories (also referred to as labels) along with the problem description so that the ticket could be routed to the appropriate support personnel. All available set of labels are arranged in the form of a hierarchy $\mathbb{H}$ by domain experts, which is a tree of height h. The present disclosure, defines this class hierarchy $\mathbb{H}$ over a partial order set ($\mathbb{C}$, $\prec$), where $\mathbb{C}=\{c_{root}, c_1, c_2, \ldots, c_n\}$ is the set of available labels and $\prec$ is the PARENT_OF relationship which satisfy following constraints.

$c_{root}$ is the root of the $\mathbb{H}$

Asymmetric: $\forall c_i, c_j \in \mathbb{C}$, if $c_i \prec c_j$, then $c_j \not\prec c_i$ Anti-reflexive: $\forall c_i \in \mathbb{C}\ c_i \not\prec c_i$ Transitive: $\forall c_i, c_j, c_k \in \mathbb{C}$ if $c_i \prec c_j$ and $c_j \prec c_k$ then $c_i \prec c_k$ A view of a part of class hierarchy is shown in the FIG. 1A. Here, it should be noted that sometimes the same label $c_i$ occurs under two different parents, e.g., list of geographies are also labels in this hierarchy, and many of these geographies have same lower level label for example xxx. In-spite of such relationships between individual nodes of the class tree, the system of the present disclosure organizes or structures the label hierarchy as a tree, which may call for repeating some of the labels. In order to route the ticket to appropriate support personnel, users need to associate a label from every level in the class hierarchy $\mathbb{H}$, i.e., the hierarchical label ($Y_i \subset \mathbb{C}$) assigned to a ticket $d_i$ can be termed as a path from root node to the leaf node of the class hierarchy $\mathbb{H}$.

In the present disclosure, conversational helpdesk systems and methods are provided, which, if necessary, will ask a few questions to the user after they provide the ticket description (also referred as 'problem description'), to arrive at the final hierarchical label $Y_i$ for the given ticket description $d_i$. A ticket description is a natural language assertion of the issue being faced by the users, and it is a sequence of words, i.e., $d_i=\{w_1^i, w_2^i, \ldots, w_m^i\}$. The present disclosure expects machine learning models of the system to learn from history ticket data $D=\{(d_1, Y_1), (d_2, Y_2), \ldots, (d_m, Y_m)\}$. The system is further expected to, after having understood the problem in the form of appropriate label hierarchy, to provide a few self-service steps to the users. If they are not able to (or don't want to) resolve the issue by following the self-service steps, they will ask the system to raise a ticket on their behalf. Table 1 as depicted above, shows how asking these questions can help against a ticket description $(d_i)$ can help us decide the label hierarchy correctly.

Referring now to the drawings, and more particularly to FIGS. 1A through 7, where similar reference characters denote corresponding features consistently throughout the figures, there are shown preferred embodiments and these embodiments are described in the context of the following exemplary system and/or method.

Figure 1B:
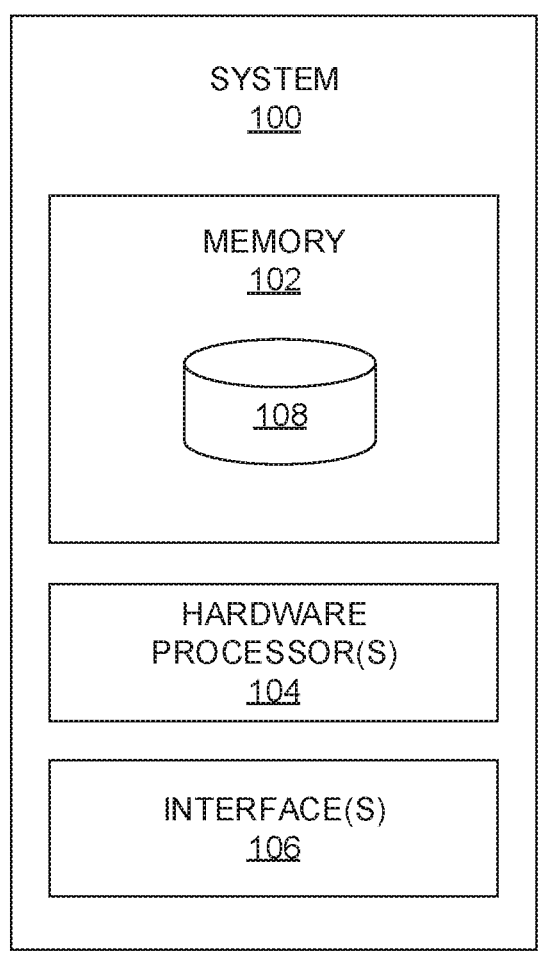
FIG. 1B illustrates an exemplary block diagram of a system for processing words of problem description to intelligently identify queries and obtain responses from user to automatically log ticket on behalf of the user, in accordance with an embodiment of the present disclosure.

FIG. 1B, with reference to FIG. 1A, illustrates an exemplary block diagram of a system 100 for processing words of problem description to intelligently identify queries and obtain responses from user to automatically log ticket on behalf of the user, in accordance with an embodiment of the present disclosure. The system 100 may also be referred as 'a conversational based ticket logging system' or 'an automated conversational helpdesk system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to, labels, problem description and corresponding tickets, and the like. More specifically, the labels may correspond to one or more categories/domains, and associated relationship thereof which get stored in the database 108. In an embodiment, the memory 102 may store one or more technique(s) (e.g., a Sequence to Sequence (Seq2Seq) Hierarchical Classification Model, a Seq2Seq Slot Filling Model, a Bi-directional Recurrent Neural Network (RNN) with Long Short-Term Memory (LSTM) technique, and the like) which when executed by the one or more hardware processors 104 perform the methodology described herein. The memory 102 may further comprise information pertaining to input (s)/output(s) of each step performed by the systems and methods of the present disclosure.

Figure 2:
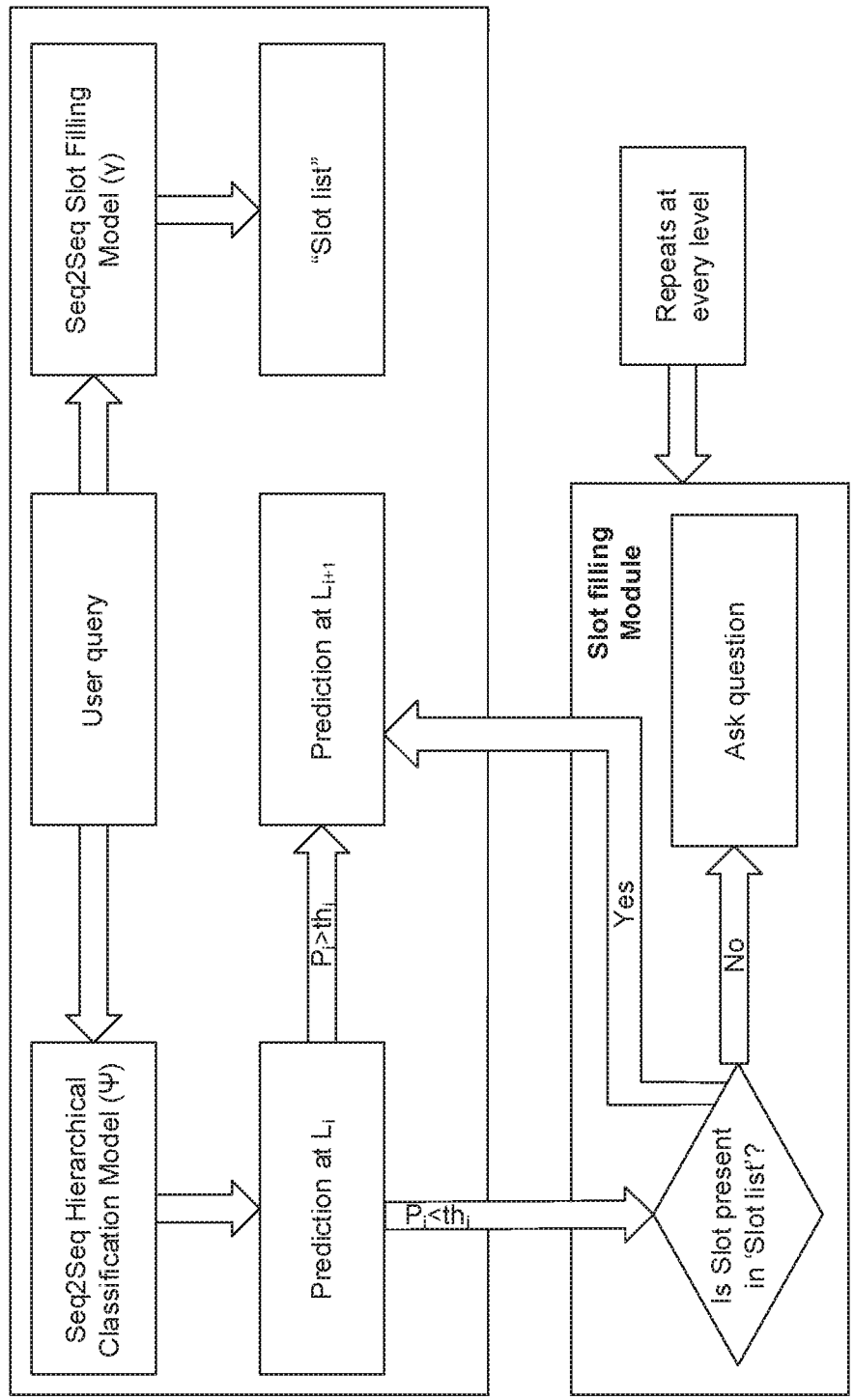
FIG. 2 illustrates an exemplary block diagram of a framework of the system for processing words of problem description to intelligently identify queries and obtain responses from user to automatically log ticket on behalf of the user, in accordance with an embodiment of the present disclosure.

FIG. 2, with reference to FIG. 1B, illustrates an exemplary block diagram of a framework of the system for processing words of problem description to intelligently identify queries and obtain responses from user to automatically log ticket on behalf of the user, in accordance with an embodiment of the present disclosure. More specifically, FIG. 2, illustrates a high level overview of various components of the system 100 of FIG. 1B. The components include two deep neural network models, a Sequence to Sequence (Seq2Seq) Hierarchical Classification Model ($\psi$) and a Seq2Seq Slot Filling Model ($\gamma$). The model $\psi$ takes ticket description/problem description $d_i$ as input sequence and outputs a sequence of nodes of the class Hierarchy $\mathbb{H}$, i.e., $Y_i$. Effectively, at every time-stamp of the output sequence (i.e., at every level of category), this model works as a classification model.

The category annotated by this model alone falls short of user expectation in terms of accuracy (described in the later paragraphs below). This can be attributed to badly (or incorrectly) labeled data, and missing information in ticket descriptions, as described above. Therefore, it is hard to get a clean labeled history ticket data, and the present disclosure intends to achieve this by way of the systems and methods as described herein. Therefore to achieve the above, the system 100 asks questions to users as shown in Table 1 above whenever the confidence (also referred as confidence score) of the first model ψ is low. Details of what to ask questions may now be referred below:

What question to ask: In order to decide what questions to ask, the system 100 assumes that it needs to ask a question for confirmation about every candidate class. For example, against the example $d_i$ shown in Table 1, after two levels of classification (Internal-IT ≺ E-mail Service), the system should ask a question "Which e-mail do you use: . . . ?", for all e-mail services. However, if the original ticket description contains the information about the e-mail client, e.g., $d_2$ of Table 1, the system should not ask this question, and proceed further with the classification at next level. The system 100 implements use the Seq2Seq Slot Filling Model γ to decide whether such information is already present, and system should not ask corresponding question. This is to avoid annoying user experience of asking for some information that is already present in the ticket description, e.g., avoid asking question "Q1" for ticket description $d_2$ in Table 1.

The model γ is executed once for a given problem description $d_i$, to check for presence of information (slot) in $d_i$, corresponding to one the next possible classes in the hierarchy ℍ. If such information is present, the decision about classification at this level is also made, and classification at next level is proceeded in the model ψ. If however, no such information is present, the system asks a question about every possible class at that level, i.e., "Do you use Lotus Notes?, Do you use Outlook?, . . . ". As a result, the model γ helps the system 100 to avoid asking questions about information already present in the ticket description. It is to be noted that the model γ only asks question(s) to user when the confidence of classification is low at any level in the model ψ. This approach herein may be referred as "Slot Filling Assisted Question Asking (SFAQA)".

Training Data for Model γ: Training data for the slot filling model γ is not available readily, and it becomes a road-block in making the system run based on history ticket data only. Therefore embodiments of the present disclosure enable systems and methods associated thereof to generate the training data based on attention weights of the tickets classified with high confidence by the model ψ. Below is a description on Sequence to Sequence (Seq2Seq) Learning, provided by the present disclosure for better understanding of the embodiments described herein:

Sequence to Sequence (Seq2Seq) Learning: Seq2Seq learning framework has been proposed in the context of Neural Machine Translation (NMT) and widely used in many different areas such as text summarization, image captioning, natural language generation (NLG), etc. Seq2seq models generally consist of an encoder (𝔼) and a decoder (𝔻). The encoder and decoder can be implemented using Recurrent Neural Networks (RNNs), Convolutional Neural Networks (CNNs), or a combination of the two. In the present disclosure, Seq2seq framework where RNNs are used both for 𝔼 and 𝔻 is considered. An RNN-based encoder 𝔼 converts a variable length input sequence of symbols, $x=(x_1, x_2, \ldots, x_T)$, into a fixed length vector representation, $c=g_𝔼(\{h_1, \ldots, h_T\})$. Where $h_t=f_𝔼(h_{t-1},x_t)$, ($h_t \in ℝ^m$) represents the hidden state of the RNN at time step t; $f_𝔼$ and $g_𝔼$ are non-linear functions. According to 'Sequence to Sequence Learning with Neural Networks. CoRR abs/1409.3215 (2014) by Ilya Sutskever, Oriol Vinyals, and Quoc V. Le., $c=h_T=g_𝔼(\{h_1, \ldots, h_T\})$. The RNN-based decoder 𝔻 generates a target sequence of symbols $y=(y_1, y_2, \ldots, y_{T'})$, one at each time step, $$p(y_{t,j} = 1/y_{t-1}, \ldots, y_1, c) = \frac{\exp(W_j s_t)}{\sum_{i=1}^{n} \exp(W_i s_t)},$$

where $s_t = f_𝔻(s_{t-1}, y_{t-1}, c)$ and n is the total number of symbols in the vocabulary of 𝔻 and W is the weight matrix, which is used to generate a probability distribution over the target symbols at each time step.

In the present disclosure, systems and methods use Long Short Term Memory (LSTM) for $f_𝔼$, and $f_𝔻$. The 𝔼 and 𝔻 networks are jointly trained by maximizing the log-likelihood $$\max_\theta \frac{1}{N} \sum_{n=1}^{N} \log p_\theta(y_n | x_n),$$

here θ represents all the trainable parameters of the 𝔼 and 𝔻 networks and $(x_n, y_n)$ is a pair of the source sequence and the corresponding target sequence of symbols, and N is the total number of such pairs.

Sequence to Sequence Learning Framework with attention: It has been shown in the conventional research works that the use of a same source representation c at every time step during the decoding process is a major bottleneck in improving the performance of NMT systems (e.g., Dzmitry Bandanau, Kyunghyun Cho, and Yoshua Bengio. 2014. Neural Machine Translation by Jointly Learning to Align and Translate. CoRR abs/1409.0473, 2014).

Further, bidirectional RNNs (BiRNN) with attention mechanism have been proposed (e.g., refer 'M. Schuster and K. K. Paliwal. November 1997. Bidirectional Recurrent Neural Networks. Trans. Sig. Proc. (November 1997).'), where an input sequence is processed in a given order $\vec{x}=(x_1, x_2, \ldots, x_T)$ by a forward RNN ($\vec{f_𝔼}$), and in the reverse order $\tilde{x}=(x_T, x_{T-1}, \ldots, x_1)$ by a backward RNN ($\overleftarrow{f_𝔼}$). Here, we use i and j for indexing the 𝔻 and 𝔼 time steps respectively. Now the hidden state $h_j=[\vec{h_j}; \overleftarrow{h_j}]^T$ where $\vec{h_j}$ and $\overleftarrow{h_j}$ are the states obtained after processing the symbol $x_j$ by $\vec{f_𝔼}$ and $\overleftarrow{f_𝔼}$, respectively. Instead of using the same representation x at every time step, a different $c_i$ at every time step i is used during the decoding process by paying attention to the relevant part of x for predicting the next symbol in the target sequence as $p(y_i=1/y_{i-1}, \ldots, y_1, x)=g'(s_i, y_{i-1}, c_i)$ where $s_i=f(s_i, y_{i-1}, c_i)$.

Here $c_i=\sum_{j=1}^{T} \alpha_{ij} h_j$ is the weighted sum of the states obtained from 𝔼. The weight assigned to the state $h_j$ during decoding a time step i is represented by $$\alpha_{ij} = \frac{\exp(e_{ij})}{\sum_{k=1}^{T} \exp(e_{ik})}$$

and calculated using an alignment model (e.g., refer 'Dzmitry Bandanau, Kyunghyun Cho, and Yoshua Bengio. 2014. Neural Machine Translation by Jointly Learning to Align and Translate. CoRR abs/1409.0473 (2014).—hereinafter can be referred as Dzmitry et al.' or conventional alignment model). The alignment model calculates a similarity score between the encoder state $h_j$ and decoder state $s_{j-1}$ i.e., $e'_{ij}=\alpha'(s_i, h_j)$. The alignment model a is implemented using a Feedforward neural network (FNN) and trained simultaneously with the $\mathbb{E}$ and $\mathbb{D}$. In the present disclosure, systems and methods uses scoring functions wherein the current hidden state $s_i$ of $\mathbb{D}$ have been used in the scoring function instead of $s_{i-1}$ i.e., $e'_{ij}=\alpha'(s_i, h_j)$.

Figure 3:
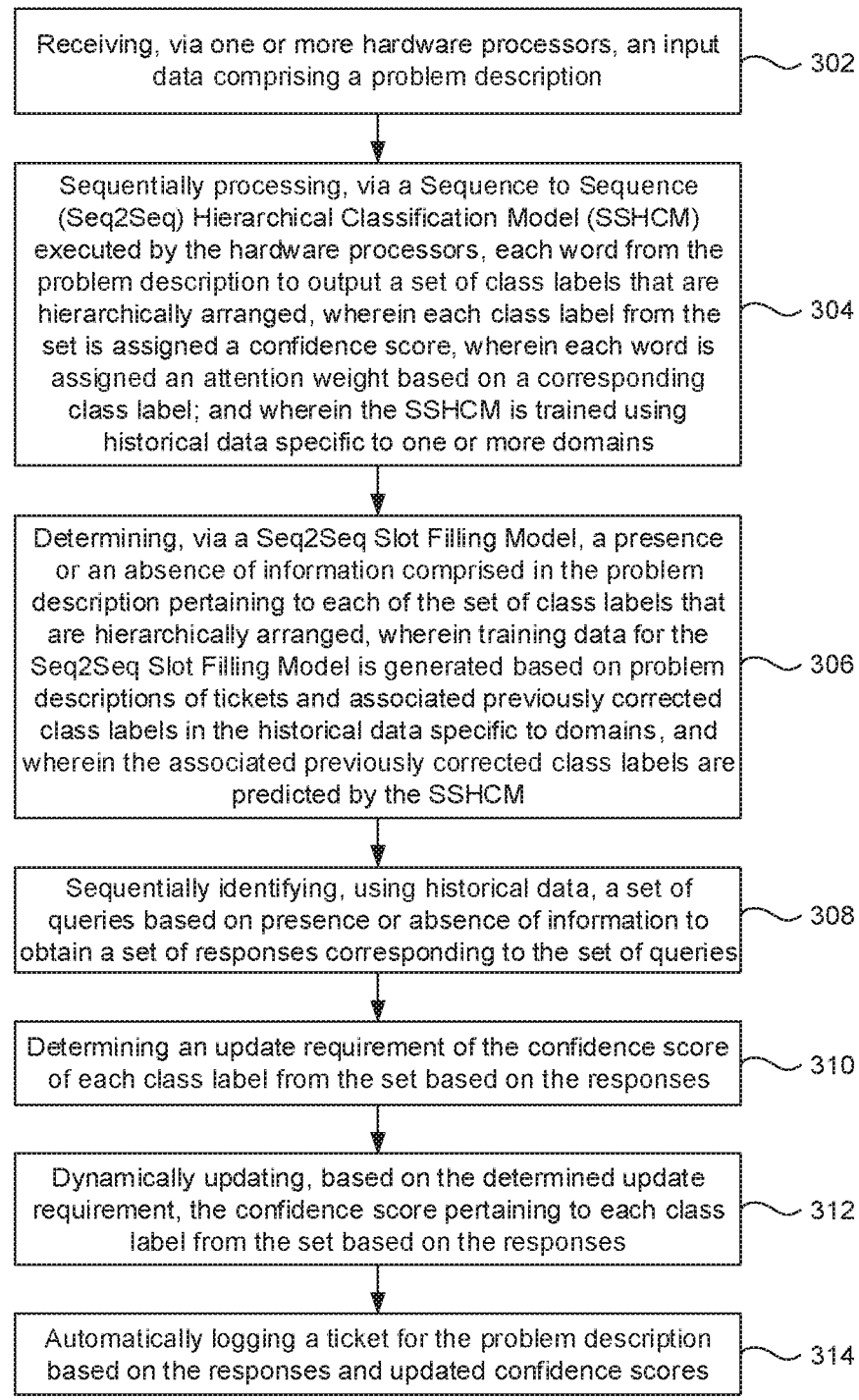
FIG. 3 illustrates an exemplary flow diagram of a method for processing words of problem description to intelligently identify queries and obtain responses from user to automatically log ticket on behalf of the user, in accordance with an embodiment of the present disclosure using the system 100 of FIG. 1B in accordance with an embodiment of the present disclosure.

FIG. 3, with reference to FIGS. 1A through 2, illustrates an exemplary flow diagram of a method for processing words of problem description to intelligently identify queries and obtain responses from user to automatically log ticket on behalf of the user, in accordance with an embodiment of the present disclosure using the system 100 of FIG. 1B in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1B, components of the system 100 of FIG. 2 and the flow diagram as depicted in FIG. 3.

In an embodiment of the present disclosure, at step 302, the one or more hardware processors 104 receive an input data comprising a problem description. In an embodiment of the present disclosure, at step 304, the one or more hardware processors 104 executes the Sequence to Sequence (Seq2Seq) Hierarchical Classification Model that sequentially processes each word from the problem description to output a set of class labels. The class labels in the set are hierarchically arranged. In an embodiment of the present disclosure, each class label from the set of class labels is assigned a confidence score. In an embodiment, each word is assigned an attention weight based on a corresponding class label. In an embodiment of the present disclosure, the Sequence to Sequence (Seq2Seq) Hierarchical Classification Model is trained using historical data specific to one or more domains. In an embodiment, the historical data is stored in the database 108 comprised in the memory 104.

Figure 4:
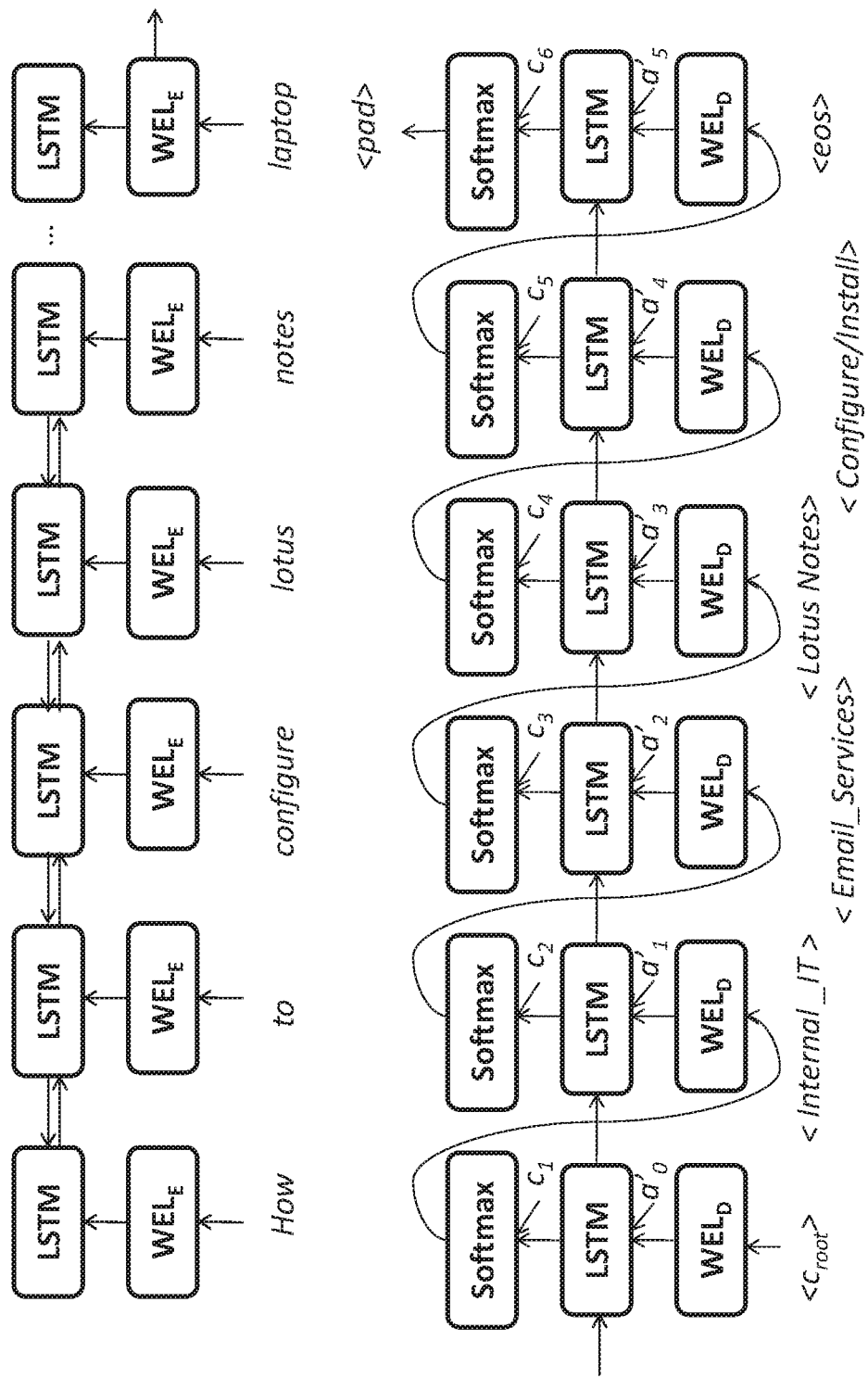
FIG. 4 illustrates a Sequence to Sequence (Seq2Seq) model for hierarchical classification of problem description, by the system of FIGS. 1B-2 in accordance with an example embodiment of the present disclosure.
Figure 5:
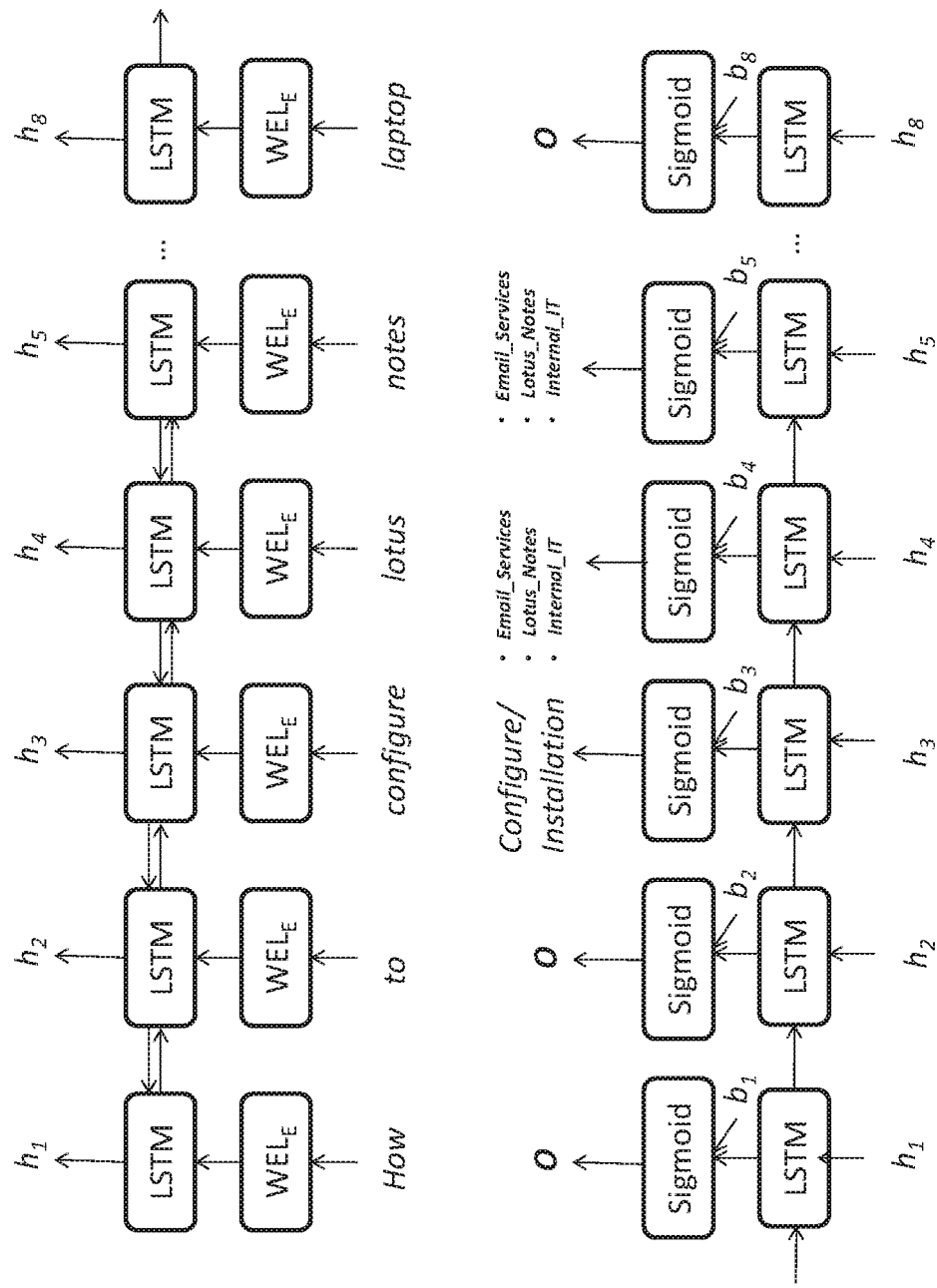
FIG. 5 illustrates an exemplary Sequence to Sequence (Seq2Seq) Slot Filling Model as implemented by the system of FIGS. 1B-2 in accordance with an example embodiment of the present disclosure.

To train Sequence to Sequence (Seq2Seq) Hierarchical Classification Model, the system 100 implements a Bi-directional RNN with LSTM cell as encoder $\mathbb{E}$ and an RNN with LSTM cell as a decoder $\mathbb{D}$, as shown in the FIG. 4. More specifically, FIG. 4, with reference to FIGS. 1A through 3, illustrates a Sequence to Sequence (Seq2Seq) model for hierarchical classification of labels by the system 100 of FIG. 1B in accordance with an example embodiment of the present disclosure. In $\mathbb{E}$, every word $w_i$ is passed through the $WEL_E$ (Word Embedding Layer Encoder) to get the corresponding vector representation $v_{w_i}$. $WEL_E$ is a matrix of size ($|V_E|, d_E$), where $|V_E|$ is the number of unique words in the dataset D and $d_E$ is the length of $v_{w_i}$. Initially $v_{w_i}$ for each word $w_i$ is obtained using word2vec technique (known in the art technique) on D and is updated during training. After the processing of $d_i$ by $\mathbb{E}$, the decoder's initial state is initialized with $s_1 = [\overleftarrow{h_T} ; \overrightarrow{h_T}]$. Training of $\mathbb{D}$ is done using teacher forcing mechanism, i.e., explicitly passing the vector representation $v_{c_i}$ of label $c_i$, where $c_i \in Y_i \subset \mathbb{C}$, to $\mathbb{D}$. Unlike $WEL_E$, $WEL_\mathbb{D}$ (Word Embedding Layer Decoder) is randomly initialized and updated during training. The vocabulary of $\mathbb{D}$ is represented by $V_D$, where $V_D = \{<eos>, <pad>\} \cup \mathbb{C}$. Along with $v_{c_i}$, the attention vector $a'_i$ is fed to $\mathbb{D}$ as input at timestep i+1, and is calculated as $a'_i = \tan h (W_c[c_i; h_i])$.

For example, vector representation for each label in the sequence (<start>, Internal IT, Email Services, Lotus Notes, Configuration/Installation, <eos>) is passed to the decoder one at a time corresponding to the ticket description "How to configure lotus notes on the laptop". $\mathbb{E}$ and $\mathbb{D}$ networks are jointly trained using an optimizer (known in the art).

Inference: $\mathbb{E}$ and attention mechanism work similar in training and inference. Unlike training, the input to $\mathbb{D}$, along with $a'_i$, at timestep i+1 is the label which is predicted with highest probability at timestep i. To arrive at the final sequence of labels for $d_i$ the system 100 implements a beam search technique (as known in the art) which is comprised in the memory 104 and executed to perform the above methodology described herein.

In an embodiment of the present disclosure, at step 306, the one or more hardware processors 108 execute a Seq2Seq Slot Filling Model that determines presence or an absence of information comprised in the problem description pertaining to each of the set of class labels that are hierarchically arranged. In an embodiment, level of presence or an absence of information comprised in the problem description is based on the assigned confidence score to each class label from the set of class labels. It is to be noted that training data for the Seq2Seq Slot Filling Model is generated based on one or more problem descriptions of one or more tickets and associated previously corrected class labels comprised in the historical data specific to one or more domains, wherein the associated previously corrected class labels are predicted by the Sequence to Sequence (Seq2Seq) Hierarchical Classification Model comprised in, and executed by the system 100. In one example embodiment, the training data for the Seq2Seq Slot Filling Model that is generated is stored in the database 108 comprised in the memory 104.

Below is an explanation provided of slot filling as a sequence labeling problem, and training data generation for Seq2Seq Slot Filling Model for better understanding of the embodiments of the present disclosure:

Slot filling is modeled as a sequence labeling problem, where the source and target sequences are of the equal lengths, i.e., $|d_i|=|s_{t_i}|$. As mentioned above, unlike in the existing conventional works, there exist one to many mappings between source and target symbols in the present disclosure. For example, in below Table 2, the word "notes" is mapped to more than one labels {Internal IT, Email Services, Lotus Notes}. The system 100 therefore implements a multi-label classifier at each timestep in the decoder (e.g., refer FIG. 5 described in detail hereinafter). More specifically, FIG. 5, with reference to FIGS. 1A through 4, illustrates an exemplary Sequence to Sequence (Seq2Seq) Slot Filling Model as implemented by the system 100 of FIG. 1 in accordance with an example embodiment of the present disclosure.

TABLE 2

| | | | Output of Seq2Seq Slot Filling Model ($\gamma$) | | | | |
|---|---|---|---|---|---|---|---|
| Sentence | how | to | configure | lotus | notes | on | the | laptop |
| Slots | O | O | Configuration/ Installation | Email_services | Email_services | O | O | O |
| | — | — | — | Lotus_Notes | Lotus_Notes | — | — | — |
| | — | — | — | Internal_IT | Internal_IT | — | — | — |

Training data (D') generation for Slot Filling Model ($\gamma$): The system uses the model $\psi$, to choose and annotate the training dataset D' ⊂ D for slot filling. The present disclsoure hypothesizes, "Ideally, the classification model $\psi$ should use different sets of information (words) for identifying the correct class label at each level of the class hierarchy ℍ ". According to the example depicted in FIG. 5, it is partially true, because for the ticket description "please reset my India domain password" the model $\psi$ has predicted the sequence of labels {Internal_IT, TCS_Domain, India_Domain, User_Account_Issues_India} based on the sequence of sets of words {{India, domain, password}, {India}, {India}, {reset, password, domain, please}} respectively. More specifically, FIG. 6, with reference to FIGS. 1A through 5, illustrates an attention heat map for user query "Please reset my India domain password" in accordance with an example embodiment of the present disclosure. In the above user query, relation between word $w_i$ in the ticket description $d_i$ and predicted labels is made based on the value of attention $$\alpha_{ij} = \frac{\exp(e_{ij})}{\sum_{k=1}^{T} \exp(e_{ik})},$$

where $\alpha_{ij}$ represents the value of attention as given by $\psi$ to the word $w_j$ while predicting the label at timestep i. In other words, relationship between a word in the problem description and a corresponding predicted class label is based on a corresponding assigned attention weight, in one example embodiment.

It is also observed that sometimes $\psi$, predicts labels by giving more attention on irrelevant words as compared to relevant words. For example in the FIG. 6, model predicts the label "Configuration/Installation" based on the set of words {how, configure}, where "how" is not a relevant word to the prediction. More specifically, FIG. 7, with reference to FIGS. 1A through 6, illustrates an attention heat map for user query "How to configure lotus notes on the laptop ?" in accordance with an example embodiment of the present disclosure. The system 100 tags all irrelevant words in the ticket description/problem description with the symbol 'O' and relevant words with the labels as shown in the Table 2 above according to Equation (1) below as expression by way of example. In other words, the step of sequentially processing each word from the problem description as depicted in step 304 comprises identifying one or more relevant words and one or more irrelevant words. In the present disclosure, the system 100 does not consider stopwords in the equation (1). The system only takes those ticket descriptions $d_i$ from D, where prediction made by $\psi$ is correct and $\psi$ is confident about it, i.e., log-likelihood score is above threshold $th_{as}$. To avoid mapping of multiple words to a label $c_p$, an upper bound on the number of words $w_c$ and a threshold $th_{as}$ on the attention score, $at\_score=\Sigma_{i=1}^{|W_{count}|}\alpha_{ij}$ are used and implemented by the present disclosure such that $$\text{Label} = \begin{cases} c_p & \text{if } at_{score} \geq th_{as} \text{ AND } |W_{count}| \leq w_c \\ O & \text{Otherwise} \end{cases} \quad (1)$$

where $th_{as}$ and $w_c$ are fine-tuned using validation data.

In a nutshell, one or more labels are assigned to a word comprised in a problem description of a corresponding ticket when (i) summation of attention weights associated with a set of words comprised in the problem description is greater or equal to a threshold attention weight, and (ii) cardinality of the set of words is less than a word count threshold. Below is an exemplary description of training the model $\gamma$ for better understanding of the embodiments of the present disclosure.

Training model $\gamma$: The system implements a Bi-directional RNN with LSTM cell as 𝔼, which is similar to what we have used for hierarchical classification. Initial state of 𝔻 is initialized with the final state of 𝔼 which is obtained by processing $d_i$ in forward direction, i.e., $s_1=\vec{h}_T$. The system 100 only pass the hidden state $h_i$ of 𝔼 as input to the decoder at each timestep i of decoding, as shown in FIG. 4. More specifically, FIG. 4, illustrates an exemplary Seq2Seq Slot Filling Model as implemented by the system 100 of FIG. 1 in accordance with an example embodiment of the present disclosure. The $b_i=\Sigma_{j=1}^{T}\alpha_{ij}h_j$ in FIG. 4 denotes the representation of $d_i$ at timestep i. To predict multiple labels corresponding to each word in $d_i$, instead of softmax, the system 100 uses sigmoid nonlinearity and minimizes the loss function as shown in the below equation (2). In equation (2), T' is the source and target sequence length, N is the total number of training instances in D', $st_{pi}$ represents the multi-hot vector of ground truth labels at timestep i and $z_i$=sigmoid $(W_s \tanh[b_i; h_i])$ where $z_i \in \mathbb{R}^{|V_D|}$ represents the corresponding predicted real valued vector and $V_D$={O, <pad>, <unk>} ∪ C represents the vocabulary of the decoder 𝔻.

$$\frac{1}{N}\sum_{q=1}^{N}\sum_{i=1}^{T'} st_{pi} * -\log(z_i) + (1-st_{pi}) * -\log(1-z_i) \quad (2)$$

Inference: During the inference phase, a user's problem description $d_i$ is passed to the encoder by the system 100 (see FIG. 2) and all labels at each timestep i at the decoder which satisfy the condition mentioned in below equation (3) are collected.

$$\text{identified\_slots} = \bigcup_{1 \leq i \leq T'} V_D[\text{position}[z_i \geq th_s]] \quad (3)$$

The identified_slots contain all the unique slots identified by γ from $d_i$. For example in the FIG. 4, γ has identified the following unique slots {O, Configuration/Installation, Internal_IT, Email_Services, Lotus_Notes} corresponding to the problem description "How to configure lotus notes on the laptop". In equation (3), $th_s \in \mathbb{R}$, is the threshold on the slot scores which are predicted by γ for every slot label in the $V_D$ at every timestep i. position[$z_i \geq th_s$] returns the set of indices at timestep i, where predicted score is more than the pre-defined threshold, i.e., $th_s$.

In an embodiment of the present disclosure, at step 308, the one or more hardware processors 108 sequentially identifying, using historical data, a set of queries based on the presence or absence of information comprised in the problem description to obtain a set of responses corresponding to the set of queries. In other words, wherever the class label has a low confidence score, the system 100 identifies a question and asks the user to provide a response. Alternatively, the set of queries are identified when the confidence score of a plurality of class labels from the set of class labels is less than or greater than a pre-defined confidence threshold.

Below are examples of how the above models are required to ask questions to user.

Asking Questions: For all benchmarks k=5 for top-k options is used or set by the system 100, since Recall in top-5 predictions was observed as 90% (See Table 7).

No Questions (NQ): In this approach, system does not ask any question to the user, and only go by the predictions made by the category classification model.

All Questions Asked (AQA): In this scheme, at any level of Model (ψ), if the top-k options contain more than one unique label, the system 100 asks a question to the user. In some of the benchmarks, top-k options were filterd that are obtained after rejecting the options that have log likelihood lesser than a prior threshold. For example, For example as shown in below Table 3, all top-5 options at level 1 and 2, have the same predicted labels "Internal_IT" and "Email_Services" respectively. As a result, system does not ask any questions at these levels and proceed to next level. At Level 3, "Zimbra/thunderbird" is predicted three times, and "Outlook" and "Lotus_Notes" are predicted once each. The system 100 therefore asks binary question to the user, related to every category, e.g., "Do you use Zimbra/thunderbird?", and choose the label based on users' answer. The remaining options are dropped from the list for subsequent levels also, e.g., if user chooses "Zimbra/thunderbird", second and third options are dropped completely for level 4 also. More specifically, Table 3 depicts Top-5 predictions made by ψ, where A, B refers to the labels "Internal_IT" and "Email_Services", in one example embodiment.

Referring back to ask questions to user, present disclosure describes and implements Slot Filling Assisted Question Asking (SFAQA): In this scheme, the goal is to avoid asking a question to the user, if the relevant information has already been provided by the user in the ticket description/problem description, e.g., see Table 1 above, the system 100 refrains from asking question Q-1 for ticket $d_2$. After running the beam search technique in model ψ, if more than one labels are present in the top-k options (or filtered top-k options) at any level of class hierarchy (or time-stamp of output sequence), the output of slot filling model is used by the system 100 to identify the right label from such options. In this case, the slot filling model is run/executed to identify that information related to which of candidate options is present in the ticket description. If no such information is present in the ticket, system would ask a question to the user, and not otherwise. For example, for the ticket in below Table 4 ($d_3$ in Table 1), at level 2, top-k options contain two labels "Software" and "Email_Services". Here, the slot filling model would predict presence of a word related to label "Email_Services". As a result, system would not ask any question to the user at this level and proceed to next level. Note: At next level options related to "Software" are not considered any more by the system 100 of FIG. 1B. Below Table 4 depicts Top-5 predictions made by ψ, where A, B refers to the labels "Internal_IT" and "Email_Services" and O refers to the slot detected corresponding to the irrelevant words:

TABLE 3

| please install thunderbird on my system {$th_1$ = −0.00017, $th_2$ = −0.044, $th_3$ = −0.188, $th_4$ = −0.385} | | | | | | | |
|---|---|---|---|---|---|---|---|
| L1 Label | L1_Score | L2_Label | L2 Score | L3_Label | L3 Score | L4_Label | L4 Score |
| A | −0.0000417 | B | −0.019 | zimbra/thunderbird | −0.117 | install/configure_desktop_client | −0.144 |
| A | −0.0000417 | B | −0.019 | Lotus_Notes | −2.618 | configuration/installation | −2.659 |
| A | −0.0000417 | B | −0.019 | MS_Outlook | −4.069 | install/configure_client | −4.431 |
| A | −0.0000417 | B | −0.019 | zimbra/thunderbird | −0.117 | database_problems_&_other_request | −4.447 |
| A | −0.0000417 | B | −0.019 | zimbra/thunderbird | −0.117 | desktop_client_issues | −4.943 |

TABLE 4 d₃: need to install mozilla thunderbird to send patch
identified_slots = {0, A, B, Install/Configure_Desktop_Client, Zimbra_/_Thunderbird}

| $L_1$ | $L_1$_Score Label$_{th_1}$ = -0.00017 | $L_2$ | $L_2$_Score Label$_{th_2}$ = -0.044 | $L_3$ | $L_3$_Score Label$_{th_3}$ = -0.188 | $L_4$ | $L_4$_Score Label$_{th_4}$ = -0.385 |
|---|---|---|---|---|---|---|---|
| A | -0.0000354 | B | -0.102 | Zimbra_/_Thunderbird | -0.445 | Install/Configure_Desktop_Client | -0.516 |
| A | -0.0000354 | B | -0.102 | Lotus_Notes | -1.766 | Configuration/Installation | -1.806 |
| A | -0.0000354 | B | -0.102 | MS_Outlook | -2.537 | Install/configure_client | -2.961 |
| A | -0.0000354 | Software | -2.428 | non_soe | -3.336 | Application_asst' | -3.337 |
| A | -0.0000354 | Software | -2.428 | OS_Windows | -3.334 | Browser_Issues | -3.578 |

Upon receiving the set of response to the set of queries in a sequential manner, the hardware processors 108 determine an update requirement of the confidence score pertaining to each class label from the set of class labels based on the set of responses, at step 310, in one embodiment. Based on the update requirement determined by the system 100, the confidence score pertaining to each class label from the set of class labels may be (or are) dynamically updated based on the set of responses, at step 312, in one embodiment of the present disclosure. The output of step 312 is a set of updated confidence scores. Further, at step 314, the hardware processors 108 automatically log a ticket corresponding to the problem description based on the set of responses and the set of updated confidence scores. In an embodiment, the ticket is automatically logged by the system 100 based on the sequentially received responses and the set of updated confidence scores using the set of class labels that are hierarchically arranged.

Results and Discussion:

Baseline Approaches

TF-IDF with Feed Forward Network (λ): The systems and methods of the present disclsoure have also modeled hierarchical classification as a multi-class classification problem also referred to as "flat classification" or "direct approach" as mentioned above in the literature. Here, if the same leaf label occurs under two different parent nodes in the hierarchy $\mathbb{H}$, it is considered as a different class in this model, ignoring the hierarchy. As a result, hierarchical category can be uniquely identified from any leaf node. It is a two layer feed forward neural network with softmax at the end, where input to the network is the tf_idf score corresponding to the words present in the user query $d_i$ and target leaf node is identified according to $e_i$=softmax($W_2$*(relu($W_{tf-idf}$*$d_{i(tf-idf)}$+$b_{tf-idf}$))$^T$+$b_2$), $W_2$ represents the weight matrix and $b_{tf-idf}$, $b_2$ represents the corresponding bias vector. $e_i$ is the probability distribution over leaf nodes. The input to the model λ is the vector $d_{i(tf-idf)} \in \mathbb{R}^{|V_E|}$, containing tf-idf scores corresponding to the words present in the $d_p$.

Model Performance on Ticket Dataset

Ticket Dataset Description: This dataset comprised of three months of history ticket data with corresponding labels taken from currently used helpdesk system. A distribution of number tickets and high level categories is shown in below Table 5. The corresponding class hierarchy H is a tree of height h=4 and the number of leaf nodes in the tree is 1275 and the total number of nodes in the H tree is 1918 including the $c_{root}$.

TABLE 5

Ticket count per top-level category

| Top-Level Category | Ticket-count |
|---|---|
| Administration Services | 81,607 |
| HR Services | 18,239 |
| Internal IT | 3,12,517 |
| IRC Services | 1,898 |
| Overseas Deputation | 268 |
| Internal Product Support | 601 |
| Zabbix | 1 |
| Total | 4,15,131 |

Available data was divided/split into three parts in ratio (60-20-20), i.e., 2,49,627 (Train), 82,532 (Validation), and 82,972 (Test) tickets respectively. Here, validation data was used for hyper-parameter tuning.

Training Details: Word embeddings for tokens (delimited by space) were initialized using word2vec technique known in the art and were fine tuned during the training. Optimization technique (e.g., refer Diederik P. Kingma and Jimmy Ba. 2014. Adam: A Method for Stochastic Optimization', CoRR (2014)) was use and learning rate was selected from the range [1e-2, 1e-3] for all the models i.e., (ψ, λ, γ). The number of LSTM cells and number of layers in (ψ, γ) were selected from the [100, 150, 200, 250, 300] and from research works (e.g., refer 'Mucahit Altintas and Cuneyd Tantug. 2014. Machine Learning Based Ticket Classification in Issue Tracking Systems. In Proceeding of the International Conference on Artificial Intelligence and Computer Science (AICS)' and Dzmitry Bandanau, Kyunghyun Cho, and Yoshua Bengio. 2014. Neural Machine Translation by Jointly Learning to Align and Translate. CoRR abs/1409.0473 (2014)') respectively. The number of cells and layer in 2L were selected from the [64, 128, 512, 1024, 2048, 4096, 8192] and from the above mentioned research works respectively. For regularization, dropout was used as described by Carlos et al (e.g., refer 'Carlos N. Silla Jr. and Alex A. Freitas. 2009. A Global-Model Naive Bayes Approach to the Hierarchical Prediction of Protein Functions. In Proceedings of the 2009 Ninth IEEE International Conference on Data Mining (ICDM '09)'). Values of the thresholds {$th_1$, $th_2$, $th_3$, $th_4$, $th_s$, $th_{as}$, $w_c$} were determined based on validation data. $th_{as}$=0.9 and $w_c$=3 were used during the experiments.

Performance Benchmarks: Accuracy of the two models λ and ψ are presented in different setting, first without asking any questions (NQ), second when all questions are asked (AQA), and finally when the redundant questions are not asked by using the slot filling model (γ), i.e., SFAQA. Apart from accuracy, the present disclosure also presents the number of questions asked in below Table 6. More specifically, Table 6 depicts performance of different architectures on test data

TABLE 6

| | Metric | | |
|---|---|---|---|
| Architecture | Accuracy in % | Recall @5 in % | Number of Questions Asked |
| NQ ($\lambda$) | 65.31 | 90.62 | — |
| AQA ($\lambda$ + top-k) | 90.62 | — | 1,72,422 (100%) |
| SFAQA ($\lambda$ + top-k) | 89 | — | 1,42,375 (19.3%) |
| NQ ($\psi$) | 63.83 | 89.35 | — |
| AQA ($\psi$ + top-k) | 89.35 | — | 1,68,580 (4.4%) |
| SFAQA ($\psi$ + top-k) | 87.25 | — | 1,37,119 (22.2%) |
| NQ ($\psi$) | 63.83 | 89.35 | — |
| AQA ($\psi$ + top-k + th) | 84.94 | — | 95,466 (45.9%) |
| SFAQA ($\psi$ + top-k) | 83.90 | — | 85,274 (51.7%) |

In the last three rows of the above Table 6 the impact of filtered top-5 options (using a threshold on log likelihood) is observed on these benchmarks. In order to prepare benchmark accuracy for AQA and SFAQA approaches, real users are needed to answer the questions. In the present disclosure, performance benchmarks have been presented based on a simulated user agent which knows the actual label of a ticket, and answers every question correctly.

The tf-idf based feed forward network ($\lambda$) gives low accuracy of about 65%. However, top-5 predictions (based on the probabilities given by the output softmax layer) by this model have about 90% recall, i.e., for most of the tickets the model is able to reject 1270 of the wrong $Y_i$ successfully. If all the questions answered by the simulated user were right, as in case of all AQA benchmarks, the accuracy will be same as Recall@5 for corresponding NQ benchmark. Further in case of SFAQA, if the slot filling model ($\gamma$) does not detect the information present in a ticket description, an extra question is asked which does not result in misclassification. If however, it wrongly/incorrectly predicts the presence of information corresponding to certain category, the system would not ask a question to the user and decision may be made about wrong/incorrect $Y_i$. Therefore the accuracy of all SFAQA benchmarks is always lesser than that of corresponding AQA benchmark.

When using the slot filling assisted question asking (SFAQA) approach, with models $\lambda$ and $\psi$, 19.3% and 22.2% lesser questions were asked at the cost of about 1 and 2% accuracy respectively as compared to AQA approach. However, when using threshold based filtering of the top-5 options, 51.7% drop in the number of questions asked was observed with respect to AQA($\lambda$+top-k) approach, with an accuracy of 83.9%. Also the SFAQA($\psi$+top-k+th) achieves only 1% lesser accuracy as compared to AQA($\psi$+top-k+th), with about 6% less questions, which is a significant gain without much of drop in accuracy. As a result, the present disclosure is able to demonstrate that the slot filling model trained on the data generated via high attention words in the Seq2Seq Hierarchical classification model performs well.

Model performance on Public Dataset

Public Dataset Description: The present disclosure also presents the benchmarks of the methodology described herein on a publicly available dataset, used by Kamran et. al (e.g., refer 'Kamran Kowsari, Donald E Brown, et al. 2017. HDLTex: Hierarchical Deep Learning for Text Classification. In 2017 16th IEEE International Conference on Machine Learning and Applications (ICMLA). 364-371.').

The class hierarchy ℍ' of this dataset had a height of 2 and 134 leaf nodes. This dataset had 46, 985 documents belonging to seven different domains and each domain had several sub-domains. For example, if $d_{public}$ is related to "computer graphics" then the corresponding label would be {Computer Science, Computer Graphics}. In research work by Kamran et. al, the dataset $D_{public}$ was divided in three different subsets {WOS-11967,WOS-46985,WOS-5736}, details of each subset are given in below Table 7. More specifically, Table 7 depicts

TABLE 7

| Dataset | Train | Test | Level 1 | Level 2 |
|---|---|---|---|---|
| WOS-11967 | 8,018 | 3949 | 7 | 35 |
| WOS-46985 | 31,479 | 15,506 | 7 | 134 |
| WOS-5736 | 4,588 | 1,148 | 3 | 11 |

Training Details: Word embeddings for tokens (obtained after preprocessing similar to Kamran et. al) were initialized using 100 dimensional pre-trained glove embedding (e.g., 'Jeffrey Pennington, Richard Socher, and Christopher D. Manning. 2014. GloVe: Global Vectors for Word Representation. In Empirical Methods in Natural Language Processing (EMNLP).') and fine-tuned during the training. Optimization technique as mentioned above was used and learning rate was selected from the range [1e-2, 1e-3] for The number of LSTM cells and number of layers in ($\psi$') are selected from the [100, 150, 200, 250, 300] and from research works (e.g., refer 'Mucahit Altintas and Cuneyd Tantug. 2014. Machine Learning Based Ticket Classification in Issue Tracking Systems. In Proceeding of the International Conference on Artificial Intelligence and Computer Science (AICS)' and Dzmitry Bandanau, Kyunghyun Cho, and Yoshua Bengio. 2014. Neural Machine Translation by Jointly Learning to Align and Translate. CoRR abs/1409.0473 (2014)') respectively. respectively. For regularization, dropout as described above was used. All hyper-parameters are fine-tuned on validation set, which contains 20% of documents randomly selected from the training set. There has been no use of a validation set for hyper-parameter tuning in existing research work (e.g., Kamran et. al).

Results on $D_{public}$: Local classifiers were trained for each non-leaf node of the hierarchy ℍ' including the root node of the tree, in the existing research work of Kamran et. al. Existing research work of Kamran et. al used {CNN, RNN, DNN} for the local classifiers. For example, against the datasetWOS −46985, they have trained eight classifiers, one for classifying the given document $d_{public}$ into one of the seven domains and using the respective local classifier for identifying the sub-domain of the given document.

In contrast, in the methodology of the present disclosure, only one attention based Seq2seq hierarchical classification model $\psi$' was (or has been) trained, which identifies both domain and sub-domain for a given document. In below Table 8, accuracy of various approaches as given in the existing research work of Kamran et. al along with that of the methodology of the present disclosure is provided. Table 8 also depicts best results obtained after trying different methods proposed in existing research work by HierCost (e.g., refer 'Anveshi Charuvaka and Huzefa Rangwala. 2015. HierCost: Improving Large Scale Hierarchical Classification with Cost Sensitive Learning. In Proceedings of the 2015th European Conference on Machine Learning and Knowledge Discovery in Databases—Volume Part I (ECMLPKDD'15). Springer, Switzerland.').

Rank of every algorithm were calculated on the three datasets, using Wilcoxon method (e.g., refere 'Frank Wilcoxon. 1992. Individual Comparisons by Ranking Methods. Springer New York.'), and it was found that methodology of the present disclosure is most (or more) versatile and performs as good as their best approach RNN_CNN.

TABLE 8

| Architecture | WOS-11967 (% accuracy) | WOS-46986 (% accuracy) | WOS-5736 (% accuracy) | Average Rank |
|---|---|---|---|---|
| DNN_DNN (Kamran et al) | 7 (83.73) | 10 (70.10) | 8 (88.37) | 8.33 |
| DNN_DNN (Kamran et al) | 9 (83.32) | 8 (71.90) | 2 (90.47) | 6.33 |
| DNN_DNN (Kamran et al) | 10 (81.58) | 5 (73.92) | 7 (88.42) | 7.33 |
| CNN_DNN (Kamran et al) | 2 (85.65) | 9 (71.20) | 6 (88.83) | 5.67 |
| CNN_CNN (Kamran et al) | 4 (85.23) | 6 (73.02) | 1 (90.93) | 3.67 |
| CNN_RNN (Kamran et al) | 8 (83.45) | 3 (75.07) | 5 (88.87) | 5.33 |
| RNN_DNN (Kamran et al) | 1 (86.07) | 7 (72.62) | 10 (88.25) | 6 |
| RNN_CNN (Kamran et al) | 3 (85.63) | 4 (74.46) | 3 (90.33) | 3.34 |
| RNN_RNN (Kamran et al) | 6 (83.85) | 2 (76.58) | 9 (88.28) | 5.66 |
| HierCost | 11 (81.03) | 11 (67.18) | 10 (88.25) | 10.66 |
| ψ' (methodology of the present disclosure) | 5 (85.16) | 1 (77.02) | 4 (89.89) | 3.34 |

Analysis of Results and System Description:

The key benefit of using the method of the present disclosure is that when the system asks a question to the user, the same slot filling model is used to parse the responses, which is used for checking the important information in the original ticket description/problem description. By asking additional questions to the user, the system 100 also captures additional natural language information about the issue/problem (described in the responses) from the user, as a result, leading to consistent categorization reducing the chances of having badly (or incorrectly) labeled data. The system 100 of the present disclosure can be integrated with any existing helpdesk system with (very) little human effort, since it generates the training data for slot filling model automatically. System integrators only need to set-up a natural language question for every node, and sometimes a question for frequently occurring filtered top-k options, e.g., "Which e-mail do you use: Lotus Notes, Outlook, Zimbra?". Self service steps can also be provided for every leaf node, which can potentially reduce the number of tickets. The framework of the present disclosure can also parse natural language responses instead of binary response (yes/no) to the questions as shown in Table 1 for ticket description $d_4$ and $d_5$. The framework can make mistake in assigning label $Y_i$ to the ticket description, if filtered top-k does not contain the correct $Y_i$ or slot filling model predicts the wrong/incorrect slot which results in elimination of the correct $Y_i$ from the candidate set of labels. Also when the ticket description contains more than one problem statement then framework can raise (or raises) a single ticket based on frequency of problem types in training data or based on user response. For example, one has to raise two separate tickets for the problem description "not able to login into skype and outlook configuration. please resolve it as soon as possible", one for "outlook configuration" and second one for "application assistance".

Embodiments of the present disclosure provide systems and methods to create conversational helpdesk system from history ticket data automatically, with little human effort. Through experimental data/results (e.g., refer tables above) demonstrated, via a simulated user, that as opposed to traditional approach of using multiple different models at every level of the class hierarchy, or of using a flat classifier, the method of the present disclosure implemented attention based seq2seq hierarchical classification model coupled with slot filling assisted question asking achieves better accuracy by a (significant) margin. The ability of the system 100 to selectively ask questions based on the confidence score assigned to each class label makes it intelligent. These selective questions are pre-defined and comprised in the memory 104 (or in the database 108) of the system 100, wherein the Seq2Seq Slot Filling Model may query the memory 104 (or in the database 108) and intelligently identify appropriate questions in a sequential manner based on the class labels that are hierarchical arranged and which have confidence score less than or greater than the pre-defined threshold (or also referred as a pre-defined confidence score). For instance, until the system 100 is confident enough to determine sufficiency of information pertaining to a question associated with a class label, the system 100 via the Seq2Seq Slot Filling Model continually asks questions to user. Once the confidence score reaches the pre-defined threshold, the system 100 may then move to next class label and the steps of determining sufficiency of information pertaining to a question associated with this next class label is performed and questions are asked to obtain assocaited responses such that the confidence score reaches the pre-defined threshold. The present disclosure also demonstrated generating training data for a slot filling model based on attention in the seq2seq classification model which is not seen in, or realized by existing convention technique(s)/research work(s). From the experimental data/results, it is also shown that the conversational helpdesk system or the system 100 can perform root cause analysis by automatically asking questions to the users.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, input data comprising a problem description;
sequentially processing, via a Sequence to Sequence (Seq2Seq) Hierarchical Classification Model executed by the one or more hardware processors, each word of the problem description;
outputting, based on the sequential processing, a set of class labels that are hierarchically arranged, wherein the hierarchically arrangement of the set of class labels includes a root label of the set of class labels and a plurality of leaf labels of the set of class labels,
the plurality of leaf labels is a subset of the root label,
each the plurality of leaf labels includes a plurality of first specific leaf labels and a plurality of second specific leaf labels,
each of the plurality of first specific leaf labels and the plurality of second specific leaf labels is a subset of the plurality of leaf labels,
the set of class labels corresponds to a set of categories in which the problem description is classified,
each class label of the set of class labels is assigned a confidence score,
the confidence score indicates prediction confidence of the Seq2Seq Hierarchical Classification Model,
each word of the problem description is assigned an attention weight based on a corresponding class label, and
the Seq2Seq Hierarchical Classification Model is trained using historical data specific to one or more domains associated with the problem description, and
the historical data specific to the one or more domains include one or more historical problem descriptions and associated historical corrected class labels;
determining, via a Seq2Seq Slot Filling Model, a presence or an absence of information in the problem description based on the assigned confidence score to each class label of the set of class labels, wherein
the information is pertaining to each of the set of class labels that are hierarchically arranged,
the Seq2Seq Slot Filling Model is modeled as a sequence labelling problem,
the Seq2Seq Slot Filling Model implements a multi label classifier at each step by mapping each word of the problem description with more than one class label and predicting specific available information in the problem description,
training data for the Seq2Seq Slot Filling Model is generated based on:
the one or more historical problem descriptions,
the associated historical corrected class labels, and
cardinality of a set of words in the problem description is less than a word count threshold, and
the associated historical corrected class labels are predicted by the Seq2Seq Hierarchical Classification Model;
sequentially identifying, using the historical data, a set of queries based on the absence of the information to obtain a set of responses corresponding to the set of queries, wherein the set of queries are further identified based on the assigned confidence score of each class label of the set of class labels that is less than a specific confidence threshold;
determining an update requirement of the assigned confidence score of each class label of the set of class labels based on the set of responses;
dynamically updating, based on the determined update requirement, the confidence score pertaining to each class label of the set of class labels to obtain a set of updated confidence scores; and
automatically logging a ticket, using the set of labels that are hierarchically arranged, corresponding to the problem description based on the set of responses and the set of updated confidence scores.

2. The processor implemented method of claim 1, wherein a relationship between a word in the problem description and a corresponding predicted class label is based on a corresponding assigned attention weight.

3. The processor implemented method of claim 1, wherein the processing of each word of the problem description further comprises identifying one or more relevant words of the problem description and one or more irrelevant words of the problem description.

4. The processor implemented method of claim 1, wherein the training data for the Seq2Seq Slot Filling Model is further generated by:
assigning one or more labels to a word comprised in a problem description of a corresponding ticket based on summation of attention weights associated with the set of words in the problem description is greater or equal to a threshold attention weight.

5. A system, comprising:
a memory storing instructions;
one or more communication interfaces; and
one or more hardware processors coupled to the memory via the one or more communication interfaces, wherein the one or more hardware processors are configured by the instructions to:
receive input data comprising a problem description;
sequentially process, via a Sequence to Sequence (Seq2Seq) Hierarchical Classification Model, each word of the problem description;
output, based on the sequential processing, a set of class labels that are hierarchically arranged, wherein
the hierarchically arrangement of the set of class labels includes a root label of the set of class labels and a plurality of leaf labels of the set of class labels,
the plurality of leaf labels is a subset of the root label,
each the plurality of leaf labels includes a plurality of first specific leaf labels and a plurality of second specific leaf labels,
each of the plurality of first specific leaf labels and the plurality of second specific leaf labels is a subset of the plurality of leaf labels,
the set of class labels corresponds to a set of categories in which the problem description is classified,
each class label of the set of class labels is assigned a confidence score,
the confidence score indicates prediction confidence of the Seq2Seq Hierarchical Classification Model,
each word of the problem description is assigned an attention weight based on a corresponding class label, and
the Seq2Seq Hierarchical Classification Model is trained using historical data specific to one or more domains associated with the problem description, and
the historical data specific to the one or more domains include one or more historical problem descriptions and associated historical corrected class labels;
determine, via a Seq2Seq Slot Filling Model executed by the one or more hardware processors, a presence or an absence of information comprised in the problem description based on the assigned confidence score to each class label of the set of class labels, wherein
the information is pertaining to each of the set of class labels that are hierarchically arranged,
the Seq2Seq Slot Filling Model is modeled as a sequence labelling problem,
the Seq2Seq Slot Filling Model implements a multi label classifier at each step by mapping each word of the problem description with more than one class label and predicting specific available information in the problem description,
training data for the Seq2Seq Slot Filling Model is generated based on:
the one or more historical problem descriptions,
the associated previously corrected class labels,
cardinality of a set of words in the problem description is less than a word count threshold, and
the associated historical corrected class labels are predicted by the Seq2Seq Hierarchical Classification Model;
sequentially identify, using the historical data, a set of queries based on the absence of information to obtain a set of responses corresponding to the set of queries, wherein the set of queries are further identified based on the assigned confidence score of each class label of the set of class labels that is less than a specific confidence threshold;
determine an update requirement of the assigned confidence score of each class label of the set of class labels based on the set of responses;
dynamically update, based on the determined update requirement, the confidence score pertaining to each class label from the set of class labels to obtain a set of updated confidence scores; and
automatically log a ticket, using the set of labels that are hierarchically arranged, corresponding to the problem description based on the set of responses and the set of updated confidence scores.

6. The system of claim 5, wherein a relationship between a word in the problem description and a corresponding predicted class label is based on a corresponding assigned attention weight.

7. The system of claim 5, wherein the one or more hardware processors are configured by the instructions to sequentially process each word of the problem description to identify one or more relevant words and one or more irrelevant words.

8. The system of claim 5, wherein the training data for the Seq2Seq Slot Filling Model is further generated by:
assigning one or more labels to a word comprised in a problem description of a corresponding ticket based on summation of attention weights associated with the set of words in the problem description is greater or equal to a threshold attention weight.

9. One or more non-transitory machine readable information storage mediums comprising one or more instructions which when executed by one or more hardware processors cause:
receiving, via one or more hardware processors, input data comprising a problem description;
sequentially processing, via a Sequence to Sequence (Seq2Seq) Hierarchical Classification Model executed by the one or more hardware processors, each word of the problem description;
outputting, based on the sequential processing, a set of class labels that are hierarchically arranged, wherein
the hierarchically arrangement of the set of class labels includes a root label of the set of class labels and a plurality of leaf labels of the set of class labels,
the plurality of leaf labels is a subset of the root label, each the plurality of leaf labels includes a plurality of first specific leaf labels and a plurality of second specific leaf labels, each of the plurality of first specific leaf labels and the plurality of second specific leaf labels is a subset of the plurality of leaf labels, the set of class labels corresponds to a set of categories in which the problem description is classified, each class label of the set of class labels is assigned a confidence score, the confidence score indicates prediction confidence of the Seq2Seq Hierarchical Classification Model, each word of the problem description is assigned an attention weight based on a corresponding class label, and the Seq2Seq Hierarchical Classification Model is trained using historical data specific to one or more domains associated with the problem description, and the historical data specific to the one or more domains include one or more historical problem descriptions and associated historical corrected class labels;

determining, via a Seq2Seq Slot Filling Model, a presence or an absence of information in the problem description based on the assigned confidence score to each class label of the set of class labels, wherein the information is pertaining to each of the set of class labels that are hierarchically arranged, the Seq2Seq Slot Filling Model is modeled as a sequence labelling problem, the Seq2Seq Slot Filling Model implements a multi label classifier at each step by mapping each word of the problem description with more than one class label and predicting specific available information in the problem description, training data for the Seq2Seq Slot Filling Model is generated based on:
the one or more historical problem descriptions,
the associated previously corrected class labels, and
cardinality of a set of words in the problem description is less than a word count threshold, and
the associated historical corrected class labels are predicted by the Seq2Seq Hierarchical Classification Model;

sequentially identifying, using the historical data, a set of queries based on the absence of the information to obtain a set of responses corresponding to the set of queries, wherein the set of queries are further identified based on the assigned confidence score of each class label of the set of class labels that is less than a specific confidence threshold;

determining an update requirement of the assigned confidence score of each class label of the set of class labels based on the set of responses;

dynamically updating, based on the determined update requirement, the confidence score pertaining to each class label of the set of class labels to obtain a set of updated confidence scores; and automatically logging a ticket, using the set of labels that are hierarchically arranged, corresponding to the problem description based on the set of responses and the set of updated confidence scores.

10. The one or more non-transitory machine readable information storage mediums of claim 9, wherein a relationship between a word in the problem description and a corresponding predicted class label is based on a corresponding assigned attention weight.

11. The one or more non-transitory machine readable information storage mediums of claim 9, wherein the processing of each word of the problem description further comprises identifying one or more relevant words of the problem description and one or more irrelevant words of the problem description.

12. The one or more non-transitory machine readable information storage mediums of claim 9, wherein the training data for the Seq2Seq Slot Filling Model is further generated by:
assigning one or more labels to a word comprised in a problem description of a corresponding ticket based on summation of attention weights associated with the set of words in the problem description is greater or equal to a threshold attention weight.

* * * * *